US012647024B2

(12) United States Patent
Maina Ari

(10) Patent No.: US 12,647,024 B2
(45) Date of Patent: Jun. 2, 2026

(54) POWER FACTOR CORRECTION CIRCUIT FOR MOTOR DRIVE FOR AN APPLIANCE

(71) Applicant: Haier US Appliance Solutions, Inc., Wilmington, DE (US)

(72) Inventor: Adam Maina Ari, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 311 days.

(21) Appl. No.: 18/507,702

(22) Filed: Nov. 13, 2023

(65) Prior Publication Data

US 2025/0158514 A1 May 15, 2025

(51) Int. Cl.
*H02M 1/42* (2007.01)
*H02M 1/00* (2007.01)
*H02P 27/08* (2006.01)

(52) U.S. Cl.
CPC ....... *H02M 1/4216* (2013.01); *H02M 1/0019* (2021.05); *H02P 27/08* (2013.01)

(58) Field of Classification Search
CPC .. H02M 7/5387; H02M 1/007; H02M 1/4225; H02M 1/0019; H02M 1/4208; H02M 1/4216; H02P 27/08
See application file for complete search history.

(56) References Cited

U.S. PATENT DOCUMENTS

| 10,084,372 | B1 | 9/2018 | Subramaniam et al. |
| 2011/0031911 | A1* | 2/2011 | Marcinkiewicz ... H02M 1/4225 |
| | | | 318/400.3 |
| 2017/0176056 | A1* | 6/2017 | Eicher .................... F24F 13/20 |

* cited by examiner

*Primary Examiner* — Said Bouziane
(74) *Attorney, Agent, or Firm* — Dority & Manning, P.A.

(57) ABSTRACT

A motor drive circuit for dynamically adjusting a power factor correction (PFC) output voltage in an appliance is provided. The motor drive circuit includes a PFC circuit configured to provide a PFC output voltage to a DC bus, wherein the PFC circuit is configured to adjust the PFC output voltage based on a feedback signal received at the PFC circuit. The motor drive circuit further includes a PFC analog circuit coupled between a controller and the PFC circuit. The PFC analog circuit is configured to adjust the feedback signal based on a PFC output voltage setpoint from the controller.

20 Claims, 10 Drawing Sheets

800

Receiving, by the PFC Circuit, a
Feedback Signal Indicative of the Output
Voltage of the PFC Circuit                    —1010

Adjusting the Feedback Signal Using a
PFC Analog Circuit Coupled Between a
Controller for the Motor Drive and the
PFC Circuit Based on a PFC Output
Voltage Setpoint from the Controller        —1020

POWER FACTOR CORRECTION CIRCUIT FOR MOTOR DRIVE FOR AN APPLIANCE

FIELD

Example aspects of the present disclosure relate to appliances and more particularly to motor drives for appliances.

BACKGROUND

Certain domestic appliances exist that include electric motors that rotate at variable speeds. These electric motors are commonly controlled using motor drives that supply the motor with 3-phase AC power. A power factor correction (PFC) circuit is commonly included in many conventional motor drives of domestic appliances to maintain a DC bus voltage in the motor drive based on a PFC output voltage setpoint set in the hardware of the PFC.

SUMMARY

Aspects and advantages of embodiments of the present disclosure will be set forth in part in the following description, or can be learned from the description, or can be learned through practice of the embodiments.

One example aspect of the present disclosure is directed to a motor drive circuit for dynamically adjusting a power factor correcting (PFC) output voltage in an appliance. The motor drive circuit may include a PFC circuit configured to provide a PFC output voltage to a DC bus. The PFC circuit may be configured to adjust the PFC output voltage based on a feedback signal received at the PFC circuit. The motor drive circuit may also include an inverter coupled to the PFC circuit. The inverter may be configured to convert the PFC output voltage on the DC bus to a three-phase power. The motor drive circuit may also include a controller configured to control the inverter and a PFC analog circuit coupled between the controller and the PFC circuit. The PFC analog circuit may be configured to adjust the feedback signal based on a PFC output voltage setpoint from the controller.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1:
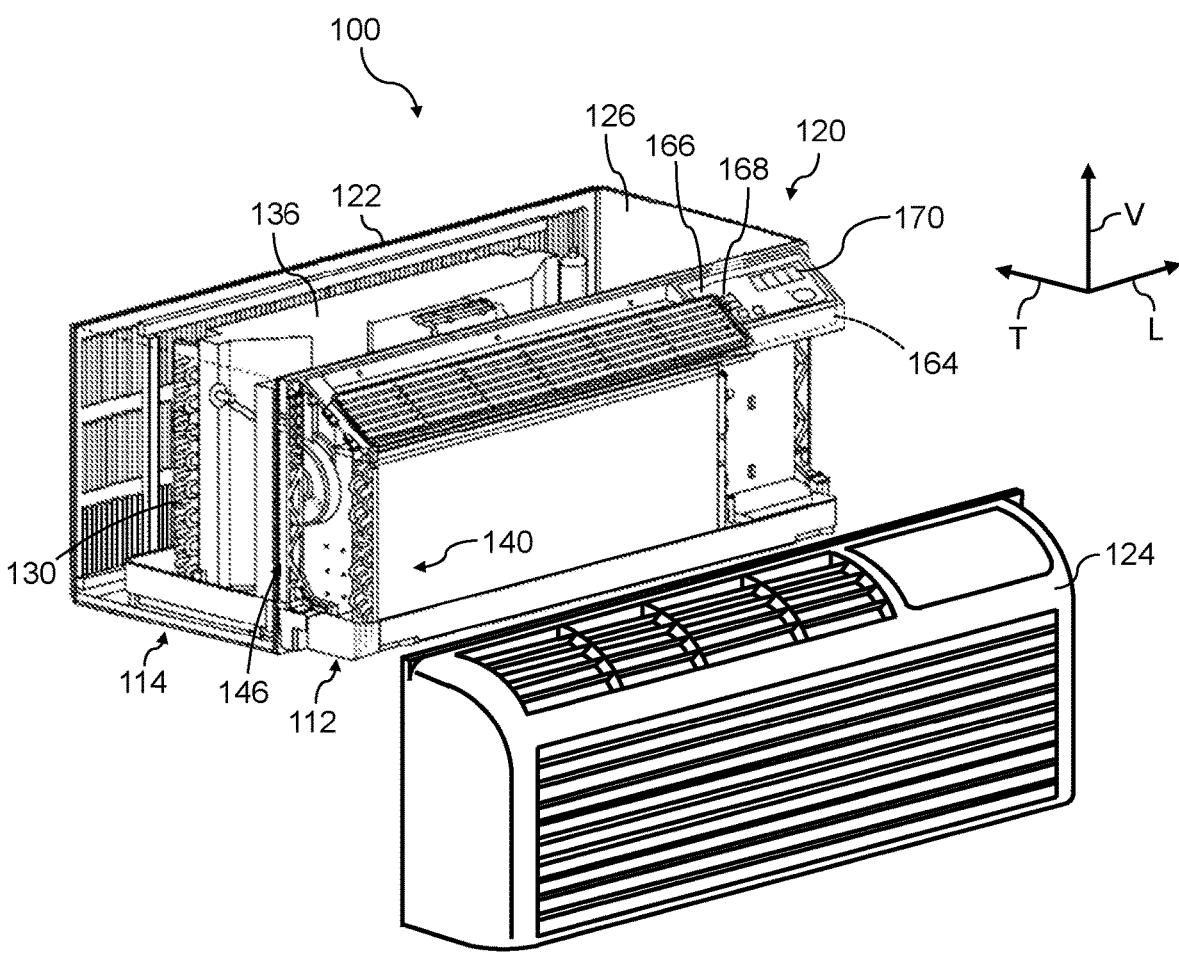
FIG. 1 provides a perspective view of an air conditioner unit, with part of an indoor portion exploded from a remainder of the air conditioner unit for illustrative purposes, in accordance with example embodiments of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a motor drive for an appliance, such as a motor drive for a compressor of an HVAC system, heat pump water heater, a refrigerator, or other appliance, or a motor drive for other motors used in appliances (e.g., for a dishwasher, washing machine, dryer, etc.) A motor drive may include an inverter that converts DC power on a DC bus to three-phase power for driving the motor. A rectifier and/or AC/DC converter may convert AC power from a power source (e.g., 120V or 240V power source) to DC power for the DC bus. A power factor correction (PFC) circuit may regulate the voltage on the DC bus. The PFC circuit of the motor drive may include a commercially available standard designed PFC controller to regulate the output voltage of the PFC circuit via a feedback loop sensing the PFC output voltage on the DC bus using, for instance, a voltage divider circuit. In some instances, this allows only a single setting of the output voltage to be achieved by the controller of the PFC circuit. Accordingly, a way of dynamically setting the output voltage would be beneficial as the bus voltage could be matched to a more efficient mode of operating the motor.

According to example aspects of the present disclosure, additional hardware components are included that will interact with the feedback loop of the PFC circuit to allow the PFC output voltage to be adjusted by a controller of the motor drive without having to change the programming of the PFC controller. A control algorithm may determine the PFC output voltage setpoint of the PFC circuit to regulate the output voltage of the PFC circuit based at least in part on the operating condition of the motor in order to increase the efficiency of the hardware and motor(s) system.

In some examples, the PFC controller is a procured component from a supplier and is commonly designed to regulate the output voltage of the PFC circuit by sensing the voltage via a fixed resistive voltage divider. In these examples, only a single setting of the output voltage can be achieved in hardware for the PFC.

According to example embodiments of the present disclosure, additional hardware components (e.g., an analog circuit coupled between the controller and the PFC circuit) will interact with the fixed resistive voltage divider allowing the sensed output voltage to be adjusted. This allows for the implementation of the control algorithm to adjust the PFC output voltage setpoint without having to adjust the settings of the PFC controller.

In one example aspect of the present disclosure, a method for adjusting output voltage of a power factor correction (PFC) circuit for a motor drive in an appliance is provided. The method may include receiving, by the PFC circuit, a feedback signal indicative of the output voltage of a PFC circuit. The method may further include adjusting the feedback signal using a PFC analog circuit coupled between a controller for the motor drive and the PFC circuit based on a PFC output voltage setpoint from the controller. The method may further include determining the PFC output voltage setpoint based on one or more parameters.

In some embodiments, the one or more parameters for determining the PFC output voltage setpoint may include sensor data indicative of one or more operating conditions of the motor. The sensor data may be indicative of motor speed, system pressure, or a temperature associated with an inverter of the motor drive.

In some embodiments, the one or more parameters for determining the PFC output voltage setpoint may include data indicative of an AC line voltage provided to the motor.

In some embodiments, the PFC output voltage setpoint is determined by the controller using a pre-loaded lookup table at the controller or by a computation by a remote device.

In some embodiments, the feedback signal is provided to the PFC circuit via a resistive voltage divider (e.g., fixed resistive voltage divider).

In some embodiments, the PFC analog circuit is configured to adjust the feedback signal received at the PFC circuit to compensate for changes in the PFC output voltage setpoint.

Another example aspect of the present disclosure is directed to a motor drive circuit for dynamically adjusting a PFC output voltage in an appliance. The motor drive circuit may include a rectifier; a PFC circuit coupled to the rectifier, the PFC circuit configured to provide a PFC output voltage to a DC bus, wherein the PFC circuit is configured to adjust the PFC output voltage based on a feedback signal received at the PFC circuit; an inverter coupled to the PFC circuit, the inverter configured to convert the PFC output voltage on the DC bus to a three-phase power; a controller configured to control the inverter; and a PFC analog circuit coupled between the controller and the PFC circuit, the PFC analog circuit configured to adjust the feedback signal based on a PFC output voltage setpoint from the controller.

In some embodiments, the controller may be configured to determine a PFC output voltage setpoint based on one or more parameters.

In some embodiments, the one or more parameters for determining the PFC output voltage setpoint may include sensor data indicative of one or more operating conditions of the motor. The sensor data may be indicative of motor speed, system pressure, or a temperature associated with an inverter of the motor drive.

In some embodiments, the one or more parameters for determining the PFC output voltage setpoint may include data indicative of an AC line voltage provided to the motor.

In some embodiments, the PFC output voltage setpoint is determined by the controller using a pre-loaded lookup table at the controller or by a computation by a remote device.

In some embodiments, the feedback signal is provided to the PFC circuit via a resistive voltage divider (e.g., fixed resistive voltage divider).

In some embodiments, the PFC analog circuit is configured to adjust the feedback signal received at the PFC circuit to compensate for changes in the PFC output voltage setpoint.

Another example aspect of the present disclosure is directed to an appliance comprising a motor drive circuit and a motor, the motor drive circuit being used to dynamically adjust the PFC output voltage in the appliance. The motor drive circuit may include a rectifier; a PFC circuit coupled to the rectifier, the PFC circuit configured to provide a PFC output voltage to a DC bus, wherein the PFC circuit is configured to adjust the PFC output voltage based on a feedback signal received at the PFC circuit; an inverter coupled to the PFC circuit, the inverter configured to convert the PFC output voltage on the DC bus to a three-phase power; a controller configured to control the inverter; and a PFC analog circuit coupled between the controller and the PFC circuit, the PFC analog circuit configured to adjust the feedback signal based on a PFC output voltage setpoint from the controller.

In some embodiments, the appliance may further include a second motor coupled to the motor drive circuit by a second inverter of the motor drive circuit. The motor drive circuit may further include a second controller configured to control the second inverter coupled between the controller and the second inverter. In some embodiments, the motor drive circuit of the appliance further includes a line filter coupled to the rectifier.

Example aspects of the present disclosure provide a number of technical effects and benefits. For instance, many conventional PFC controllers are configured to maintain a constant bus voltage (e.g. PFC output voltage), adjusting the bus voltage based solely on a feedback signal. Accordingly, the PFC voltage setpoint at which the bus voltage is held constant by these conventional PFC controllers may be a static value set in the hardware of the PFC controller and may not be adjusted. Aspects of the present disclosure provide a way of interfacing a PFC controller to dynamically set the output voltage setpoint using a main controller of a motor drive using an analog circuit coupled between the main controller and the PFC controller.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Referring now to FIG. 1, a perspective view of the example air conditioner unit 100 is depicted. The unit 100 includes an indoor portion 112 and an outdoor portion 114, and generally defines a vertical direction V, a lateral direction L, and a transverse direction T. Each direction V. L. T is perpendicular to each other, such that an orthogonal coordinate system is generally defined.

Aspects of the present disclosure are discussed with reference to an air conditioner unit 100 as an example appliance for purposes of illustration and discussion. Those of ordinary skill in the art, using the disclosures provided herein, will understand that the motor drive of the present application may be used with any suitable motor of any appliance, such as a heat pump, a refrigerator, dishwasher, dryer, washing machine, or other suitable appliance.

A housing 120 of the unit 100 may contain various other components of the unit 100. Housing 120 may include, for example, a rear grill 122 and a room front 124 which may be spaced apart along the transverse direction T by a wall sleeve 126. The rear grill 122 may be part of the outdoor portion 114, and the room front 124 may be part of the indoor portion 112. Components of the outdoor portion 114, such as an outdoor heat exchanger 130, an outdoor fan 132 (FIG. 2), and a compressor 134 (FIG. 2) may be housed within the wall sleeve 126. A casing 136 may additionally enclose outdoor fan 132, as shown.

Figure 2:
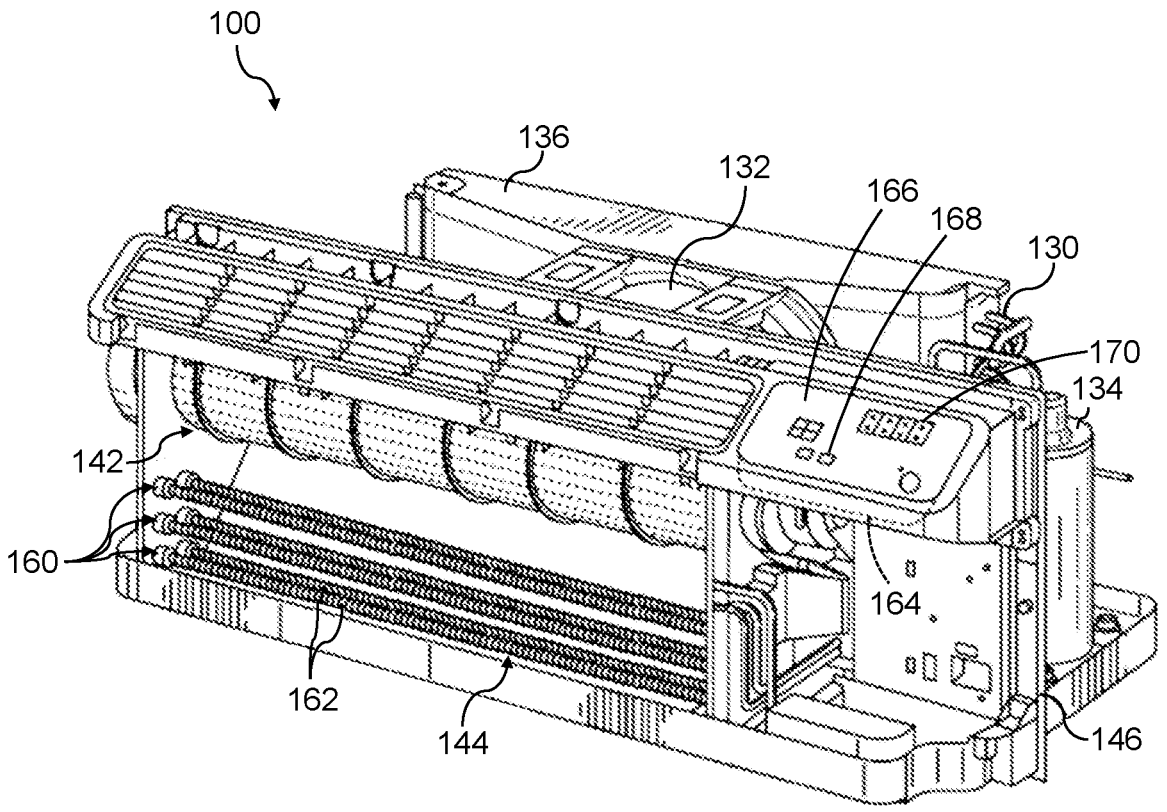
FIG. 2 is another perspective view of components of the indoor portion of the example air conditioner unit of FIG. 1.

Referring now also to FIG. 2, a perspective view of components of the indoor portion 112 of air conditioner unit 100 is illustrated. As shown, indoor portion 112 may include, for example, an indoor heat exchanger 140 (FIG. 1), a blower fan 142, and a heating unit 144. These components may, for example, be housed behind the room front 124. Additionally, a bulkhead 146 may generally support and/or house various other components or portions thereof of the indoor portion 112, such as the blower fan 142 and the heating unit 144. Bulkhead 146 may generally separate and define the indoor portion 112 and outdoor portion 114.

Figure 3:
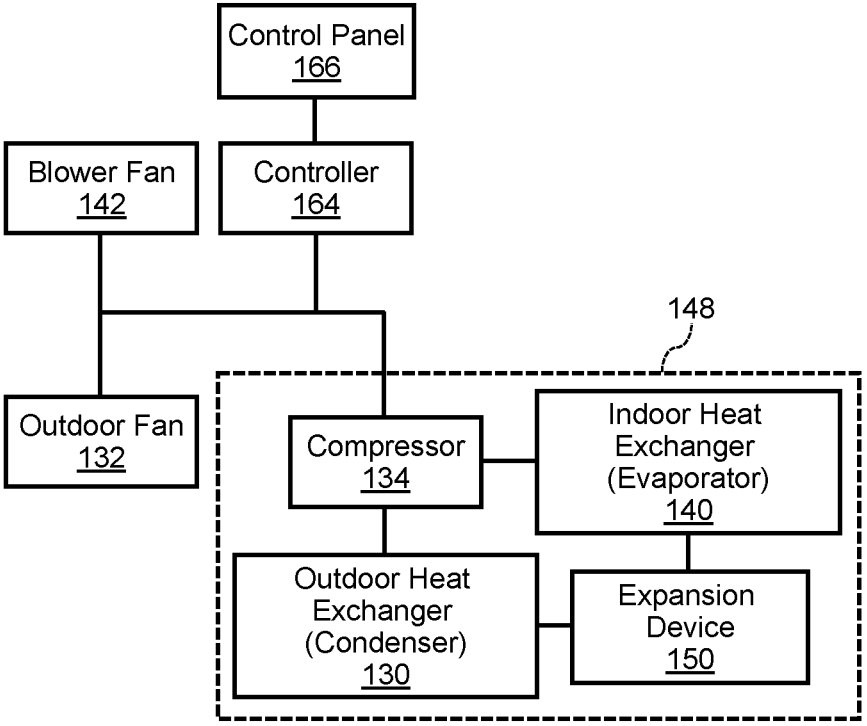
FIG. 3 is a schematic view of a refrigeration loop in accordance with embodiments of the present disclosure.

Outdoor and indoor heat exchangers 130, 140 may be components of a refrigeration loop 148, which is shown schematically in FIG. 3. Refrigeration loop 148 may, for example, further include compressor 134 and an expansion device 150. As illustrated, compressor 134 and expansion device 150 may be in fluid communication with outdoor heat exchanger 130 and indoor heat exchanger 140 to flow refrigerant therethrough as is generally understood. More particularly, refrigeration loop 148 may include various lines for flowing refrigerant between the various components of refrigeration loop 148, thus providing the fluid communication therebetween. Refrigerant may thus flow through such lines from indoor heat exchanger 140 to compressor 134, from compressor 134 to outdoor heat exchanger 130, from outdoor heat exchanger 130 to expansion device 150, and from expansion device 150 to indoor heat exchanger 140. The refrigerant may generally undergo phase changes associated with a refrigeration cycle as it flows to and through these various components, as is generally understood. Suitable refrigerants for use in refrigeration loop 148 may include pentafluoroethane, difluoromethane, or a mixture such as R410a, although it should be understood that the present disclosure is not limited to such example and rather that any suitable refrigerant may be utilized.

As is understood in the art, refrigeration loop 148 may alternately be operated as a refrigeration assembly (and thus perform a refrigeration cycle) or a heat pump (and thus perform a heat pump cycle). As shown in FIG. 3, when refrigeration loop 148 is operating in a cooling mode and thus performs a refrigeration cycle, the indoor heat exchanger 140 acts as an evaporator and the outdoor heat exchanger 130 acts as a condenser. Alternatively, when the assembly is operating in a heating mode and thus performs a heat pump cycle, the indoor heat exchanger 140 acts as a condenser and the outdoor heat exchanger 130 acts as an evaporator. The outdoor and indoor heat exchangers 130, 140 may each include coils through which a refrigerant may flow for heat exchange purposes, as is generally understood.

According to an example embodiment, compressor 134 may be a variable speed compressor. In this regard, compressor 134 may be operated at various speeds depending on the current air conditioning needs of the room and the demand from refrigeration loop 148. For example, according to an example embodiment, compressor 134 may be configured to operate at any speed between a minimum speed, e.g., 1500 revolutions per minute (RPM), to a maximum rated speed, e.g., 3500 RPM. Notably, use of variable speed compressor 134 enables efficient operation of refrigeration loop 148 (and thus air conditioner unit 100), minimizes unnecessary noise when compressor 134 does not need to operate at full speed, and ensures a comfortable environment within the room. In some embodiments, the air conditioning unit 100 may include multiple compressors 134.

The motor of compressor 134 may be supplied with power by a motor drive comprising an inverter, power electronic devices, rectifiers, power factor correction (PFC) circuitry and/or other control electronics suitable for converting an alternating current (AC) power input into a direct current (DC) power supply for the compressor. The motor drive may regulate the DC power output to any suitable DC voltage that corresponds to a specific operating speed of compressor. In this manner compressor 134 may be regulated to any suitable operating speed, e.g., from 0% to 100% of the full rated power and/or speed of the compressor. This may facilitate precise compressor operation at the desired operating power and speed, thus meeting system needs while maximizing efficiency and minimizing unnecessary system cycling, energy usage, and noise.

In example embodiments as illustrated, expansion device 150 may be disposed in the outdoor portion 114 between the indoor heat exchanger 140 and the outdoor heat exchanger 130. According to the example embodiment, expansion device 150 may be an electronic expansion valve that enables controlled expansion of refrigerant, as is known in the art. More specifically, electronic expansion device 150 may be configured to precisely control the expansion of the refrigerant to maintain, for example, a desired temperature differential of the refrigerant across the indoor heat exchanger 140. In other words, electronic expansion device 150 throttles the flow of refrigerant based on the reaction of the temperature differential across indoor heat exchanger 140 or the amount of superheat temperature differential, thereby ensuring that the refrigerant is in the gaseous state entering compressor 134. According to alternative embodiments, expansion device 150 may be a capillary tube or another suitable expansion device configured for use in a thermodynamic cycle.

According to the illustrated example embodiment, outdoor fan 132 is an axial fan and indoor blower fan 142 is a centrifugal fan. However, it should be appreciated that according to alternative embodiments, outdoor fan 132 and blower fan 142 may be any suitable fan type. In addition, according to an example embodiment, outdoor fan 132 and blower fan 142 are variable speed fans. For example, outdoor fan 132 and blower fan 142 may rotate at different rotational speeds, thereby generating different air flow rates. It may be desirable to operate fans 132, 142 at less than their maximum rated speed to ensure safe and proper operation of refrigeration loop 148 at less than its maximum rated speed, e.g., to reduce noise when full speed operation is not needed.

In addition, according to alternative embodiments, fans 132, 142 may be operated to urge make-up air into the room.

According to the illustrated embodiment, blower fan 142 may operate as an evaporator fan in refrigeration loop 148 to encourage the flow of air through indoor heat exchanger 140. Accordingly, blower fan 142 may be positioned downstream of indoor heat exchanger 140 along the flow direction of indoor air and downstream of heating unit 144. Additionally and/or alternatively, blower fan 142 may be positioned upstream of indoor heat exchanger 140 along the flow direction of indoor air and may operate to push air through indoor heat exchanger 140.

Heating unit 144 in example embodiments includes one or more heater banks 160. Each heater bank 160 may be operated as desired to produce heat. In some embodiments as shown, three heater banks 160 may be utilized. Additionally and/or alternatively, however, any suitable number of heater banks 160 may be utilized. Each heater bank 160 may further include at least one heater coil or coil pass 162, such as in example embodiments two heater coils or coil passes 162. Additionally and/or alternatively, other suitable heating elements may be utilized.

The operation of air conditioner unit 100 including compressor 134 (and thus refrigeration loop 148 generally) blower fan 142, outdoor fan 132, heating unit 144, expansion device 150, and other components of refrigeration loop 148 may be controlled by a processing device such as, e.g., a controller 164. Controller 164 may be in communication (via for example a suitable wired or wireless connection) to such components of the air conditioner unit 100. The controller 164 may be the main controller described in the example motor drive circuits that follow. The controller 164 may include a memory and one or more processing devices such as microprocessors, CPUs or the like, such as general or special purpose microprocessors operable to execute programming instructions or micro-control code associated with operation of unit 100. The memory may represent random access memory such as DRAM, or read only memory such as ROM or FLASH. In one embodiment, the processor executes programming instructions stored in memory. The memory may be a separate component from the processor or may be included onboard within the processor.

Unit 100 may additionally include a control panel 166 and one or more user inputs 168, which may be included in control panel 166. The user inputs 168 may be in communication with the controller 164. A user of the unit 100 may interact with the user inputs 168 to operate the unit 100, and user commands may be transmitted between the user inputs 168 and controller 164 to facilitate operation of the unit 100 based on such user commands. A display 170 may additionally be provided in the control panel 166 and may be in communication with the controller 164. Display 170 may, for example be a touchscreen or other text-readable display screen, or alternatively may simply be a light that can be activated and deactivated as required to provide an indication of, for example, an event or setting for the unit 100.

Figure 4:
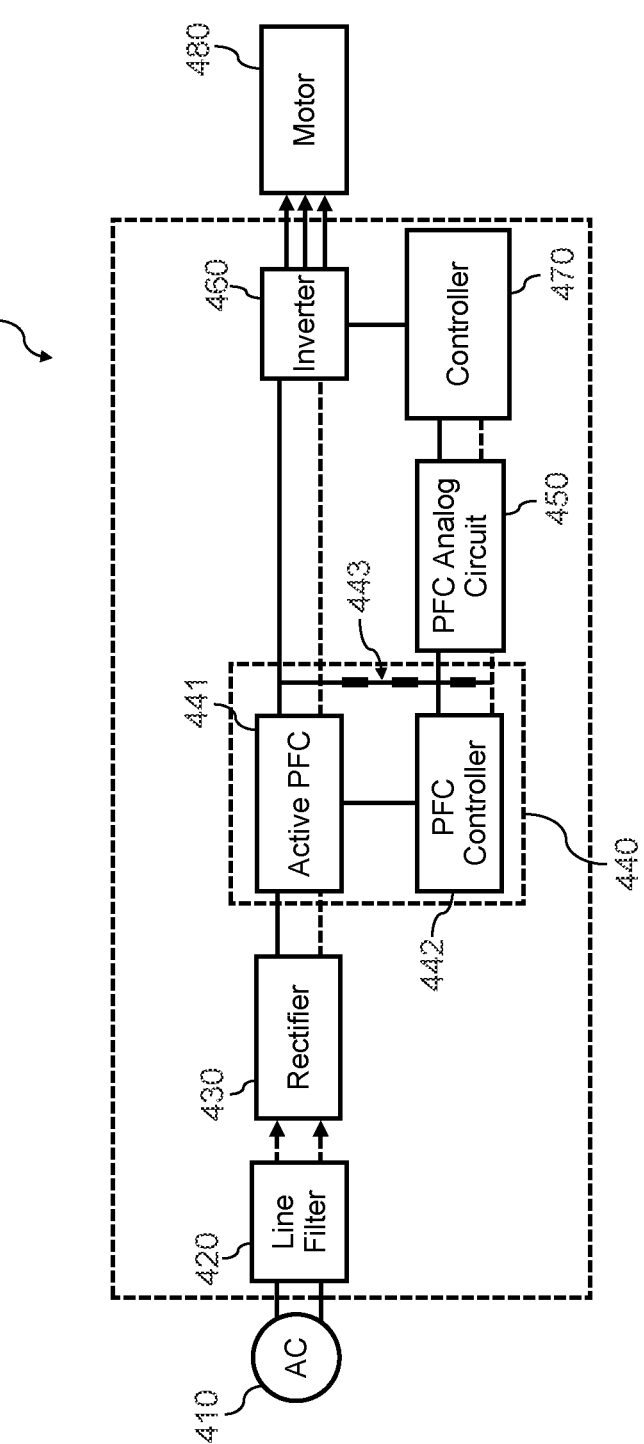
FIG. 4 depicts a block diagram of an example configuration of the motor drive circuit.

FIG. 4 depicts a block diagram of an example configuration of the motor drive circuit according to example embodiments of the present disclosure. The motor drive circuit 400 can be implemented in the air conditioning unit 100, or in any other suitable appliance, such as in a heat pump, a refrigerator, etc.

As illustrated in FIG. 4 the motor drive circuit 400 may be configured to receive power from an AC supply 410 which may provide conventional 60 Hz, 120-volt or 240- volt AC. For example, the AC supply 410 may be a residential power outlet or other power source.

The motor drive circuit 400 may include a line filter circuit 420 and rectifier circuit 430 which may be connected in series and operate to filter and rectify the voltage signal of the AC supply 410. The rectifier circuit 430 may be configured to output a DC voltage to a PFC circuit 440.

As further illustrated in FIG. 4, the motor drive circuit 400 may include a PFC circuit 440 which is configured to regulate the DC bus voltage supplied to the inverter 460 based on a feedback signal indicative of the PFC output voltage. The PFC circuit 440 may include power semiconductor devices, passive components, and a PFC controller 442.

In some embodiments, the PFC circuit 440 may include an active PFC circuit 441 and a PFC controller 442. The active PFC circuit 441 is configured to regulate the DC bus voltage received from the rectifier based on input from the PFC controller 442 and supply the PFC output voltage to the inverter 460. The PFC controller 442 is configured to control the active PFC circuit 441 based on a feedback signal indicative of the PFC output voltage. The active PFC circuit 441 may include a Boost-PFC, a Buck-Boost PFC, or any other applicable PFC type.

Controller 470 of motor drive 400 is configured to determine a PFC output voltage setpoint based on one or more parameters. Controller 470 may be configured to receive sensor data from one or more sensors (not shown) to determine the PFC output voltage setpoint. The one or more sensors are configured to monitor operating conditions of the motor drive circuit and/or the motor such as the motor speed, system pressure, and/or a temperature associated with the inverter of the motor drive. For example, the one or more sensors may include a sensor such as an IGBT thermal sensor which may determine a temperature of the inverter board. In some embodiments, the controller 470 may provide the PFC output voltage setpoint using a PWM signal.

The motor drive circuit 400 also includes a PFC analog circuit 450 which is coupled between the controller 470 and the PFC controller 442. The PFC analog Circuit 450 is coupled to the PFC controller 442 via a feedback configuration 443. The feedback configuration 443 may be coupled to the DC bus at a location between the active PFC circuit 441 and the inverter 460. Accordingly, the feedback configuration 443 may supply the feedback signal indicative of the PFC output voltage to both the PFC controller 442 and the PFC analog circuit 450. In this configuration, the PFC analog circuit 450 may adjust the PFC output voltage sent to the inverter 460 by adjusting the PFC circuit feedback signal received by the PFC controller 442. The PFC analog circuit may adjust the PFC feedback signal based on a PFC output voltage setpoint determined by a controller of the motor drive. In some embodiments, the feedback configuration 443 may include a resistive voltage divider (e.g. fixed voltage resistive divider).

The motor drive 400 may also include an inverter 460 coupled to the controller 470 and the PFC circuit 440. The inverter 460 may be controlled by the controller 470 and operate to convert the PFC output voltage on the DC bus to three-phase AC power to be supplied to a motor 480. In some embodiments, the motor drive 400 is configured to control the motor 480 of a compressor.

Figure 5:
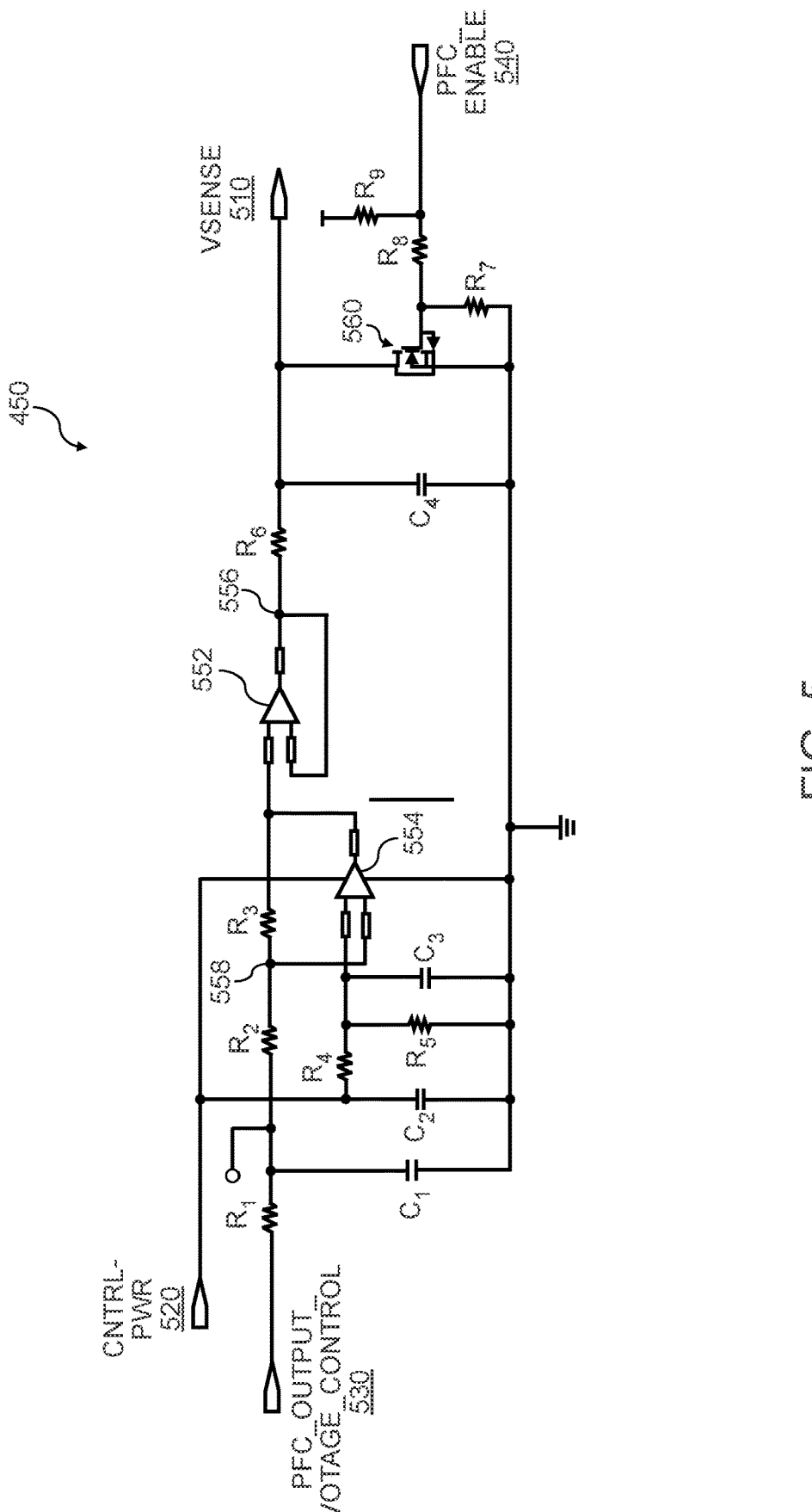
FIG. 5 depicts an example circuit schematic of the PFC analog circuit of the present disclosure.

FIG. 5 depicts an example circuit schematic of the PFC analog circuit 450 of FIG. 4. As illustrated in FIG. 5, the PFC analog circuit 450 may include one or more comparators (e.g., amplifier 552 and amplifier 554). In some examples, amplifiers 552 and 554 may be operational amplifiers (e.g., operational amplifier-based comparator). Further, the PFC analog circuit 450 may include a MOSFET 560 (e.g., N-channel MOSFET). The PFC analog circuit 450 may receive a signal indicative of output voltage setpoint from the controller 470 (FIG. 4). The PFC analog circuit 450 may process the signal to provide an output signal to the PFC circuit 440 (FIG. 4) via the feedback configuration 443 (FIG. 4) to adjust the feedback seen by the PFC controller 442 to effectively adjust the setpoint of the PFC controller 442.

More particularly, the PFC analog circuit 450 is configured to receive a signal indicative of a PFC output voltage setpoint from the controller at PFC_OUTPUT_VOLTAGE-_CONTROL node 530. In some embodiments, the PFC output voltage setpoint may be provided to the PFC analog circuit 450 at the PFC_OUTPUT_VOLTAGE_CONTROL node 530 using a pulse width modulated (PWM) signal. The PFC_OUTPUT_VOLTAGE_CONTROL node 530 may be coupled to a first input of the amplifier 552 through a network including resistors R1, R2, and R3 and capacitor C1. A feedback from node 556 at an output of amplifier 552 may be provided to a second input of the amplifier 552.

The PFC analog circuit 450 may receive power at CNTRL_PWR node 520. The CNTL_PWR node 520 may be coupled to a first input of the amplifier 554 through a network including resistors R4 and R5 and capacitors C2 and C3. The second input of the amplifier 554 may be coupled to a node 558 between R2 and R3. The output of amplifier 554 may be coupled to the first input of the amplifier 552.

The output of the amplifier 552 may be provided through a network including series resistor R6 and capacitor C4 to VSENSE node 510. VENSE node 510 provides an output signal to the PFC circuit 440 (FIG. 4) via the feedback configuration 443 (FIG. 4) to adjust the feedback seen by the PFC controller 440 to effectively adjust the setpoint of the PFC controller 440.

In some embodiments, the controller 470 may send an enable signal to the PFC analog circuit 450 at the PFC_E-NABLE node 540 that may enable the PFC analog circuit 450 to adjust the PFC feedback signal at the VSENSE node 510. More particularly, the PFC_ENABLE node 540 may be coupled to a gate of the MOSFET 560 through network including R7, R8 and R9. The signal provided to the gate of the MOSFET 560 may effectively turn on and turn off the output at the VSENSE node 510.

Figure 6:
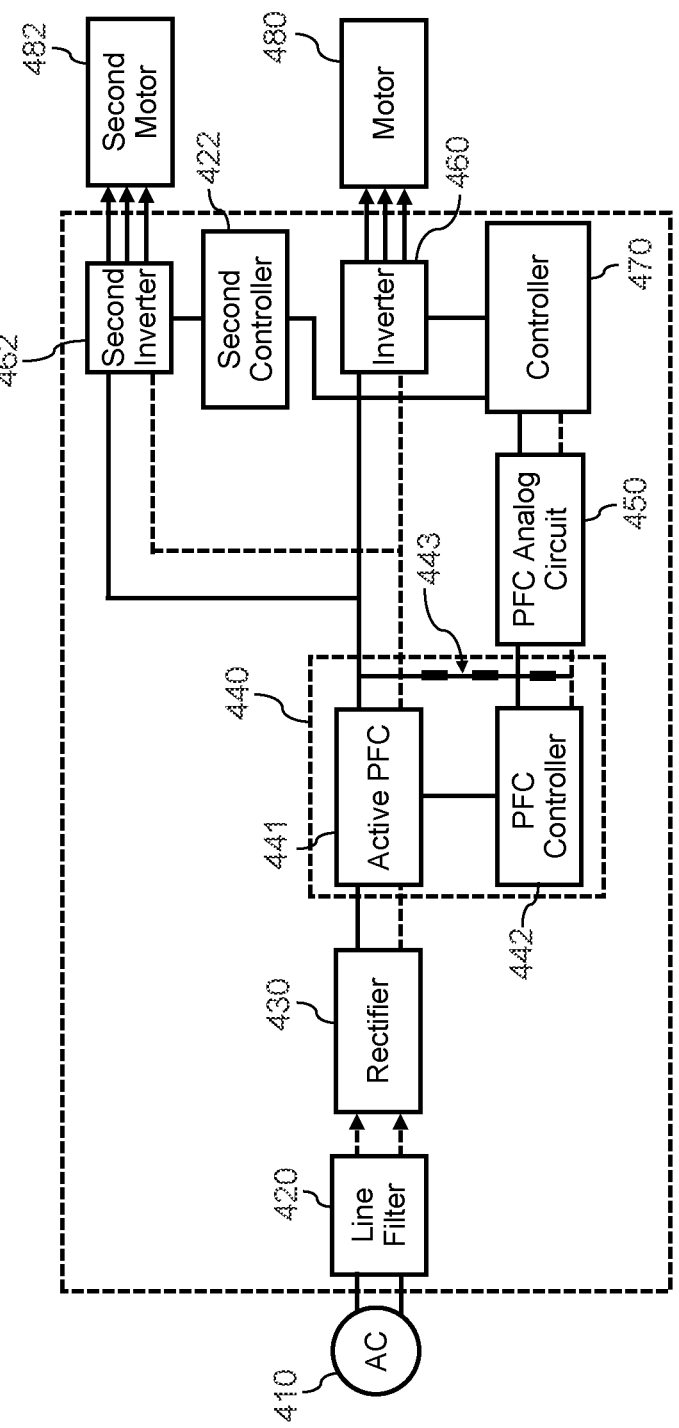
FIG. 6 depicts a block diagram of an example configuration of the motor drive circuit.

As shown in FIG. 6, the motor drive circuit of the present disclosure may be configured to control multiple motors. Accordingly, the motor drive circuit may further include a second inverter 462 and/or a second controller 472. In some embodiments, the second controller 472 is coupled between the second inverter 462 and controller 470 of the motor drive. The second controller 472 may be configured to control the speed of the second motor 482 based on instructions from the controller 470 of the motor drive.

Figure 7:
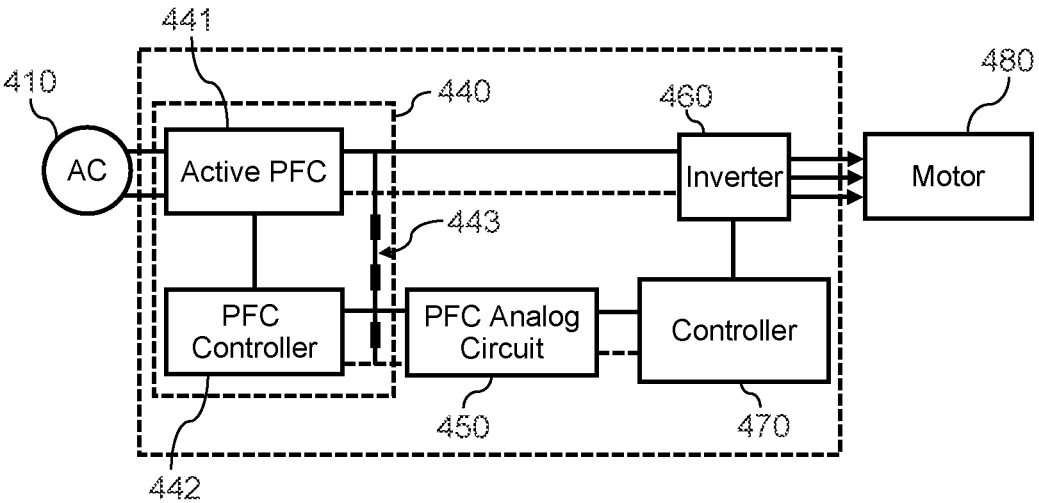
FIG. 7 depicts a block diagram of an example configuration of the motor drive circuit.

FIG. 7 depicts yet another example embodiment of the motor drive circuit of the present disclosure. As shown in FIG. 7, the motor drive circuit may not include a line filter and/or rectifier circuit. The PFC circuit 440 of the motor drive may directly interface to the AC supply 410 which may provide conventional 60 Hz, 120-volt or 240-volt AC to the active PFC. In some embodiments, the active PFC circuit 441 may include a bridgeless PFC and/or a totem-pole PFC. For example, the active PFC circuit 441 may include a bridgeless PFC and totem-pole PFC used in an interleaved configuration for high power applications.

Figure 8:
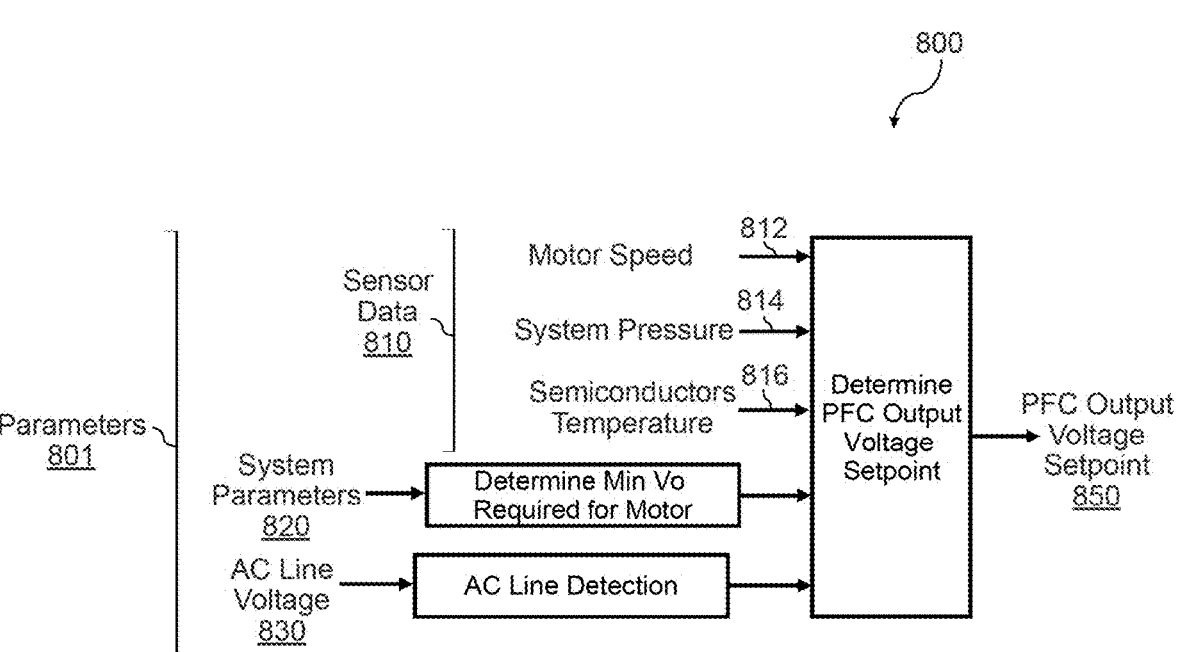
FIG. 8 depicts an overview of an example algorithm for determining a PFC output voltage setpoint according to example embodiments of the present disclosure.

FIG. 8 depicts a block diagram of an example control algorithm of operation for the motor drive circuit. As discussed in FIG. 4, the controller of the motor drive may determine a PFC output voltage setpoint 850 based on one or more parameters 801.

In some embodiments, the one or more parameters 801 used to determine the PFC output voltage setpoint 850 includes sensor data 810 indicative of one or more operating conditions of the motor (e.g. motor speed 812, system pressure 814, and/or semiconductor temperature 816).

In some embodiments, the one or more parameters used to determine the PFC output voltage setpoint 850 includes system parameters 820 (e.g. torque-torque constant of motor, resistance of motor, inlet/outlet sizing of motor casing) that may be saved to a computer readable memory device accessible to the controller of the motor drive circuit.

In some embodiments, the one or more parameters 801 used to determine the PFC output voltage setpoint includes data indicative of an AC line voltage 830 provided to the motor.

In some embodiments, the PFC output voltage setpoint 850 is determined by the controller using a pre-loaded lookup table at the controller. For example, the pre-loaded lookup table may include a plurality of ranges for a value indicative of the one or more parameters, each range in the plurality of ranges corresponding to a PFC output voltage setpoint 850. In some embodiments, the pre-loaded lookup table may include a plurality of ranges for a value indicative of sensor data, each range in the plurality of sensor data ranges corresponding to a PFC output voltage setpoint. Accordingly, the controller may "look up" a corresponding PFC output voltage setpoint based on the value indicative of the one or more parameters 801 received by the controller. The pre-loaded lookup table may be saved to a computer readable memory device accessible to the controller of the motor drive circuit.

In some embodiments, the PFC output voltage setpoint 850 is determined by a computation by a remote device. For example, the controller may send one or more parameters to a secondary device via a wireless network. The secondary device may perform a computation to determine a PFC output voltage setpoint 850 using the one or more parameters. The secondary device may then send the PFC output voltage setpoint 850 to the controller of the motor drive circuit.

In some embodiments, the controller of the motor drive circuit determines the PFC output voltage setpoint 850 based, at least in part, on a transfer function of the PFC circuit.

Figure 9:
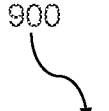
FIG. 9 depicts a block diagram of an example controller according to example embodiments of the present disclosure.
Figure 9:
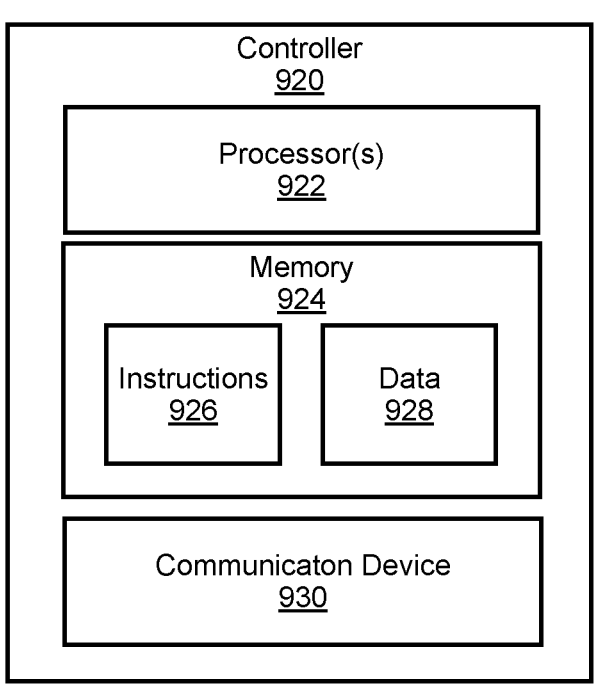

FIG. 9 depicts a block diagram illustrating an example controller implemented in embodiments of the present disclosure. Further, examples described herein, such as those illustrated in FIG. 8, may be implemented using the example controller of FIG. 9.

Embodiments of the controller 920 include one or more processor(s) 922, memory 924, and a communications module 930. The processor 922 may include a microprocessor, CPU or the like, such as a general or special purpose microprocessor operable to execute programming instructions or micro-control code. The processor 922 may operate to execute processes and/or functions described within the present disclosure. In some embodiments, processor 922 may execute programming instructions or micro-control code associated with operation of an appliance such as the air conditioner unit 100 shown in FIGS. 1-2.

The memory 924 represents computer readable memory that is accessible to the controller 920. The memory 924 may represent random access memory such as DRAM, or read only memory such as ROM or FLASH. In one embodiment, the processor 922 executes programming instructions 926 stored in memory 924. Data 928 such as a lookup table may be saved in memory 924 and be accessible to the controller 920. The memory 924 may be a separate component from the processor 922 or may be included onboard within the processor 922. The communications module 930 provides a wired and/or wireless communications bus to send and/or receive signals.

Figure 10:
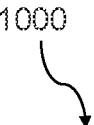
FIG. 10 depicts an example method for operating a motor drive according to example embodiments of the present disclosure.
Figure 10:
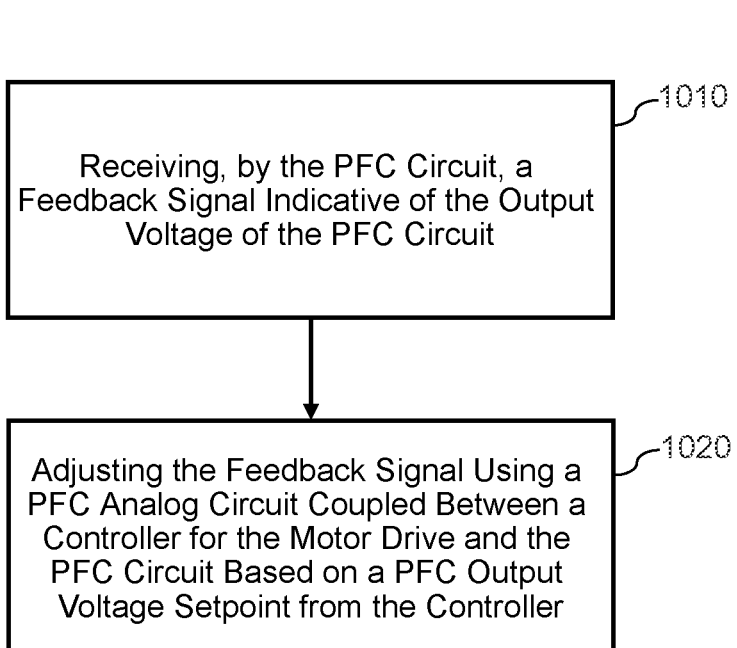

Referring now to FIG. 10, a flowchart of a method 1000 for operating an example motor drive of the present disclosure is provided. More particularly, the method 1000 can be implemented to control a motor of an appliance (e.g., as depicted in FIGS. 1-2) using a motor drive circuit (e.g., as depicted in FIG. 4 and FIGS. 6-7). FIG. 10 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. Additionally, method 1000 is generally discussed with reference to the air conditioner unit 100 described above with reference to FIGS. 1-2 and the motor drive circuit 400 described above with reference to FIG. 4. However, it should be understood that aspects of the present method 1000 can be implemented with any suitable appliance and/or motor drive circuit.

The method 1000 can include, at 1010, receiving, by the PFC circuit, a feedback signal indicative of the output voltage of the PFC circuit. In some embodiments, the feedback signal is provided to the PFC circuit using a resistive voltage divider (e.g. fixed resistive voltage divider).

Additionally and/or alternatively method 1000 can include, at 1020, adjusting the feedback signal using a PFC analog circuit coupled between a controller for the motor drive and the PFC circuit based on a PFC output voltage setpoint from the controller. In some embodiments, the PFC analog circuit is configured to adjust the feedback signal received at the PFC circuit to compensate for changes in the PFC output voltage setpoint.

The method can further include determining the PFC output voltage setpoint based on one or more parameters. In some embodiments, the one or more parameters may include sensor data indicative of one or more operating conditions of the motor. The sensor data may be indicative of motor speed, system pressure, or a temperature associated with an inverter of the motor drive. In some embodiments, the one or more parameters may include data indicative of an AC line voltage provided to the motor. In some embodiments, the PFC output voltage setpoint may be determined by the controller using a pre-loaded lookup table at the controller or by a computation by a remote device.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for adjusting output voltage of a power factor correction (PFC) circuit for a motor drive in an appliance, the method comprising:

providing, to the PFC circuit, a feedback signal indicative of the output voltage of the PFC circuit; and adjusting, by a PFC analog circuit coupled between a controller for the motor drive and the PFC circuit, the feedback signal provided to the PFC circuit based on a PFC output voltage setpoint determined by the controller.

2. The method of claim 1, further comprising:

determining, by the controller, the PFC output voltage setpoint based on one or more parameters.

3. The method of claim 2, wherein the one or more parameters comprise sensor data indicative of one or more operating conditions of the motor.

4. The method of claim 3, wherein the sensor data is indicative of motor speed, system pressure, or a temperature associated with an inverter of the motor drive.

5. The method of claim 2, wherein the one or more parameters comprise data indicative of an AC line voltage provided to the motor.

6. The method of claim 2, wherein the PFC output voltage setpoint is determined by the controller using a pre-loaded lookup table at the controller or by a computation by a remote device.

7. The method of claim 1, wherein the feedback signal is provided to the PFC circuit using a resistive voltage divider.

8. The method of claim 1, wherein the PFC analog circuit is configured to adjust the feedback signal provided to the PFC circuit to compensate for changes in the PFC output voltage setpoint determined by the controller.

9. A motor drive circuit for dynamically adjusting a power factor correction (PFC) output voltage in an appliance, the motor drive circuit comprising:

a PFC circuit configured to provide a PFC output voltage to a DC bus, wherein the PFC circuit is configured to adjust the PFC output voltage based on a feedback signal provided to the PFC circuit;

an inverter coupled to the PFC circuit, the inverter configured to convert the PFC output voltage on the DC bus to a three-phase power;

a controller configured to control the inverter; and a PFC analog circuit coupled between the controller and the PFC circuit, the PFC analog circuit configured to adjust the feedback signal provided to the PFC circuit based on a PFC output voltage setpoint determined by the controller.

10. The motor drive circuit of claim 9, wherein the controller is configured to determine the PFC output voltage setpoint based on one or more parameters.

11. The motor drive circuit of claim 10, wherein the one or more parameters comprise sensor data indicative of one or more operating conditions of the motor.

12. The motor drive circuit of claim 11, wherein the sensor data is indicative of motor speed, system pressure, or a temperature associated with the inverter of the motor drive circuit.

13. The motor drive circuit of claim 10, wherein the one or more parameters comprise data indicative of an AC line voltage provided to the motor.

14. The motor drive circuit of claim 9, wherein the motor drive circuit further comprises a rectifier coupled to the PFC circuit.

15. The motor drive circuit of claim 9, wherein the PFC circuit comprises a bridgeless or totem-pole PFC circuit coupled to an AC supply.

16. The motor drive circuit of claim 9, wherein the PFC analog circuit is configured to adjust the feedback signal provided to the PFC circuit to compensate for changes in the PFC output voltage setpoint determined by the controller.

17. An appliance, comprising:

a motor; and a motor drive circuit coupled to the motor, the motor drive circuit comprising:

a rectifier;

a PFC circuit coupled to the rectifier, the PFC circuit configured to provide a PFC output voltage to a DC bus, wherein the PFC circuit is configured to adjust the PFC output voltage based on a feedback signal provided to the PFC circuit;

an inverter coupled to the PFC circuit, the inverter configured to convert the PFC output voltage on the DC bus to a three-phase power;

a controller configured to control the inverter; and a PFC analog circuit coupled between the controller and the PFC circuit, the PFC analog circuit configured to adjust the feedback signal provided to the PFC circuit based on a PFC output voltage setpoint determined by the controller.

18. The appliance of claim 17, further comprising a second motor, the second motor being coupled to the motor drive circuit by a second inverter of the motor drive circuit.

19. The appliance of claim 18, wherein the motor drive circuit further comprises a second controller coupled between the controller and the second inverter.

20. The appliance of claim 17, wherein the motor drive circuit further comprises a line filter coupled to the rectifier.

* * * * *